United States Patent [19]

Kanuma

[11] Patent Number: 4,649,508
[45] Date of Patent: Mar. 10, 1987

[54] FLOATING-POINT ARITHMETIC OPERATION SYSTEM

[75] Inventor: Akira Kanuma, Zushi, Japan

[73] Assignee: Tokyo Shibaura Denki Kabushiki Kaisha, Kanagawa, Japan

[21] Appl. No.: 546,040

[22] Filed: Oct. 27, 1983

[30] Foreign Application Priority Data

Oct. 29, 1982 [JP] Japan ................................ 57/190303

[51] Int. Cl.$^4$ .............................................. G06F 7/38
[52] U.S. Cl. ..................................... 364/748; 364/715
[58] Field of Search ... 364/748, 749, 715, 200 MS File, 364/900 MS File

[56] References Cited

U.S. PATENT DOCUMENTS

| | | | |
|---|---|---|---|
| 2,965,297 | 12/1960 | Alrich | 364/748 |
| 3,930,232 | 12/1975 | Wallach et al. | 364/200 |
| 4,021,655 | 5/1977 | Healey et al. | 364/749 |
| 4,338,675 | 7/1982 | Palmer et al. | 364/737 |
| 4,484,259 | 11/1984 | Palmer et al. | 364/736 |

OTHER PUBLICATIONS

J. A. Eldon et al., "A Floating Point Format for Signal Processing," IEEE, 1982.
Matsui et al, "An Overflow/Underflow-Free Floating-Point Representation of Numbers", *Journal of Information Processing*, vol. 4, #3, 1981, pp. 123–133.
R. Nave et al., "A Numeric Processor," 1980, IEEE Int'l. Solid State Circuits Conf., Feb. 1980.
*Computer*, "A Proposed Standard for Binary Floating-Point Arithmetic", vol. 14, pp. 51–62, Mar. 1981, No. 3, Long Beach, CA.

*Primary Examiner*—James D. Thomas
*Assistant Examiner*—Dale M. Shaw
*Attorney, Agent, or Firm*—Schwartz, Jeffery, Schwaab, Mack, Blumenthal & Evans

[57] ABSTRACT

In a floating-point arithmetic operation system performing an arithmetic operation on two given operands X, Y and providing the result Z of the arithmetic operation, the operands X and Y are each classified according to their attributes; and, at least part of the bits of the operand X, at least part of the bits of the operand Y or a predetermined set of bits are adopted as at least part of the result Z of the operation when the results of the classifications are one of predetermined combinations.

7 Claims, 12 Drawing Figures

FIG. 4

| INPUT | | | | | | | | OUTPUT | | |
|---|---|---|---|---|---|---|---|---|---|---|
| X | | | Y | | | A+S ($=\overline{M}$) | OTHER CONDITIONS | Z (efZ) | ZS | fZ |
| ZERO | INF | NAN | ZERO | INF | NAN | | | | | |
| 0 | 1 | 0 | 0 | 0 | 0 | 1 | | X | | |
| 0 | 1 | 0 | 1 | 0 | 0 | 1 | | X | | |
| 0 | 1 | 0 | 0 | 1 | 0 | 1 | $\{\overline{S \oplus XS \oplus YS}=1$ $\{S \oplus XS \oplus YS=1$ | $\{$X $\{$NAN(*1) | 0 | 7FFFFC |
| 0 | 1 | 0 | 0 | 0 | 1 | 1 | | Y | | |
| 0 | 0 | 1 | 0 | 0 | 0 | 1 | | X | | |
| 0 | 0 | 1 | 1 | 0 | 0 | 1 | | X | | |
| 0 | 0 | 1 | 0 | 1 | 0 | 1 | | X | | |
| 0 | 0 | 1 | 0 | 0 | 1 | 1 | $\{(X>Y)_0=0$ $\{(X>Y)_0=1$ | $\{$X $\{$Y | | |
| 0 | 0 | 0 | 0 | 1 | 0 | 1 | | (Y) | S⊕YS | |
| 1 | 0 | 0 | 0 | 1 | 0 | 1 | | (Y) | S⊕YS | |
| 0 | 0 | 0 | 0 | 0 | 1 | 1 | | Y | | |
| 1 | 0 | 0 | 0 | 0 | 1 | 1 | | Y | | |
| 0 | 1 | 0 | 0 | 0 | 0 | 0 | | (∞) | XS⊕YS | |
| 0 | 1 | 0 | 1 | 0 | 0 | 0 | | NAN(*2) | 0 | 7FFFFD |
| 0 | 1 | 0 | 0 | 1 | 0 | 0 | | (∞) | XS⊕YS | |
| 0 | 1 | 0 | 0 | 0 | 1 | 0 | | Y | | |
| 0 | 0 | 1 | 0 | 0 | 0 | 0 | | X | | |
| 0 | 0 | 1 | 1 | 0 | 0 | 0 | | X | | |
| 0 | 0 | 1 | 0 | 1 | 0 | 0 | | X | | |
| 0 | 0 | 1 | 0 | 0 | 1 | 0 | $\{(X>Y)_0=0$ $\{(X>Y)_0=1$ | $\{$X $\{$Y | | |
| 1 | 0 | 0 | 0 | 1 | 0 | 0 | | NAN(*3) | 0 | 7FFFFE |
| 1 | 0 | 0 | 0 | 0 | 1 | 0 | | Y | | |
| 0 | 0 | 0 | 0 | 1 | 0 | 0 | | (∞) | XS⊕YS | |
| 0 | 0 | 0 | 0 | 0 | 1 | 0 | | Y | | |

FLOATING-POINT ARITHMETIC OPERATION SYSTEM

BACKGROUND OF THE INVENTION

The present invention relates to a floating-point arithmetic system, and more particularly to such a system formed of a semiconductor integrated circuit.

Processing of floating-point numbers has not been standardized, so that demand for execution of classification of floating-point numbers in terms of their attributes (zero, infinity, not-a-number, normalized number, and denormalized number) by hardware has not been strong. But recently, an IEEE (The Institute of Electrical and Electronics Engineers, Inc.) Standard concerning processing of floating-point numbers was proposed, and the need for processing in accordance with the classification of the floating-point numbers has arisen.

Conventional floating-point arithmetic units generally comprise a floating-point processor under microprogram control. The classification of the input operands is often done by a microprogram. Similarly, exception handling in accordance with the classification in terms of the attribute is often done by a microprogram.

Where the classification of the operands is done by a microprogram, at least one machine cycle is necessary to execute the classification. Moreover, a number of machine cycles are needed for the exception handling. As a result, the processing by the conventional system is slow.

SUMMARY OF THE INVENTION

An object of the invention is to provide a floating-point arithmetic unit which can perform the classification of the input operand and the exception processing at a high speed.

According to the invention, there is provided a floating-point arithmetic operation system performing an arithmetic operation on two given operands X, Y and providing the result Z of the arithmetic operation, comprising:
an X classification circuit receiving at least part of the bits representing the operand X to classify the operand X and producing at least one X class signal indicative of the result of the classification;
a Y classification circuit receiving at least part of the bits representing the operand Y to classify the operand Y and producing at least one Y class signal indicative of the result of the classification; and
adopting means responsive to the X class signal, and Y class signal for adopting, at least part of the bits of the operand X, at least part of the bits of the operand Y or a predetermined set of bits, as at least part of the result Z of the operation when the significances of the X class signal and the Y class signal form one of predetermined combinations.

BRIEF DESCRIPTION OF THE DRAWINGS

In the drawings

FIG. 4 is a table showing the relationship between the combination of the kind of operation to be performed and the classes of the operands and the value of Z, i.e., the result of operation;

DESCRIPTION OF THE EMBODIMENT

Figure 1:
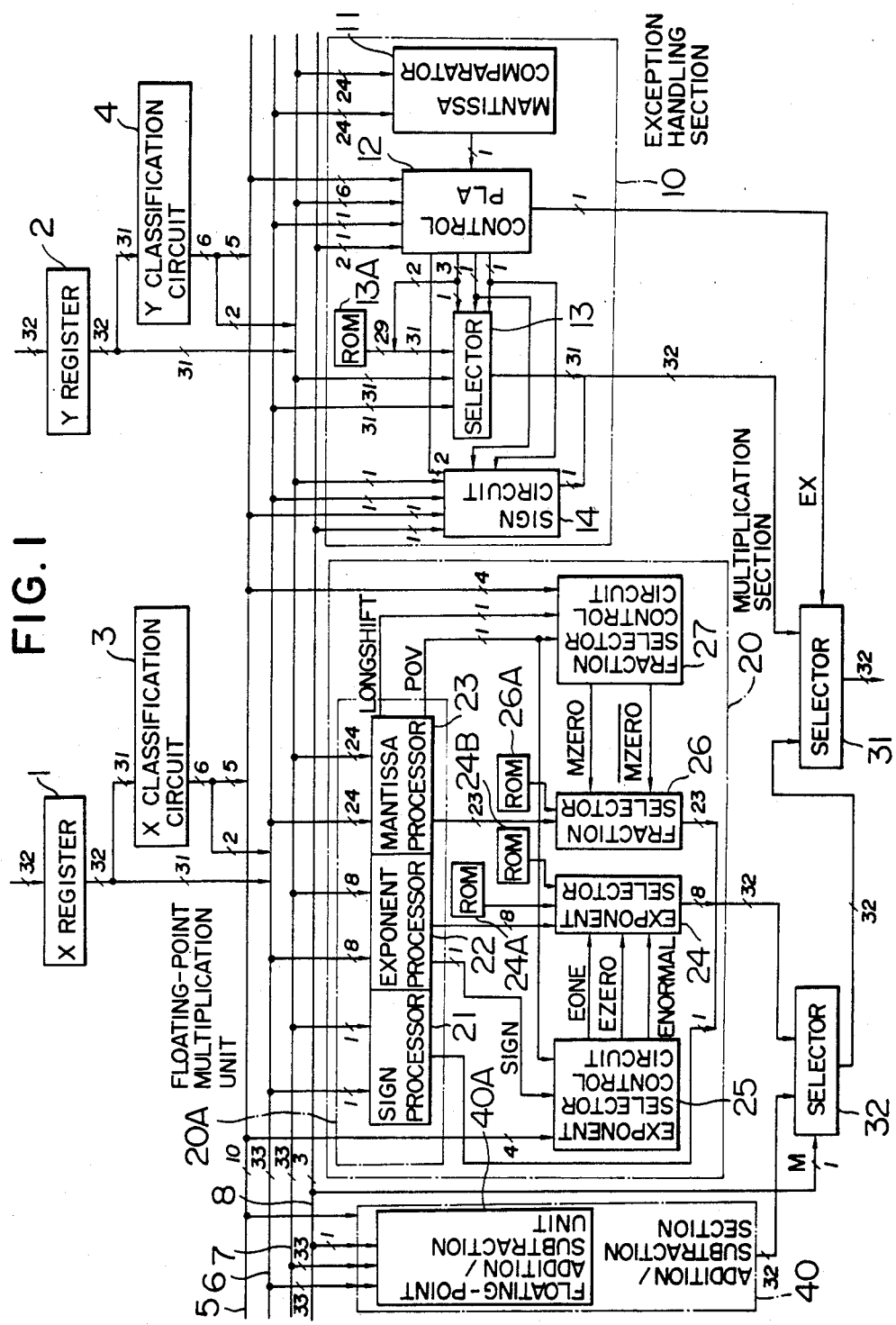
FIG. 1 is a block diagram showing an embodiment of a floating-point arithmetic operation system according to the invention.

FIG. 1 shows a floating-point arithmetic operation system of an embodiment of the invention.

Figure 2A:
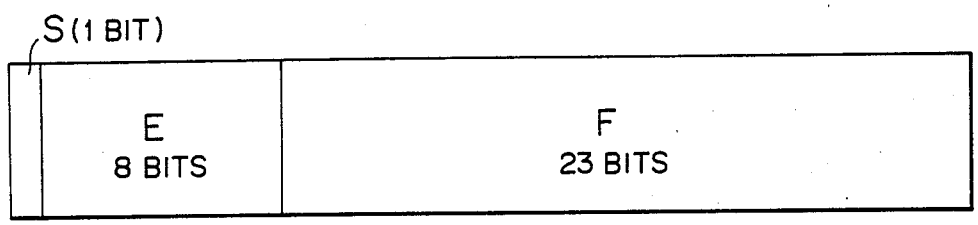
FIGS. 2A, 2B and 2C show formats of floating-point numbers as expressed at various part of the system.

A first or X register 1 is a register receiving and storing a first operand X of 32 bits. A second or Y register 2 is a register receiving and storing a second operand Y of 32 bits. Each of the operands X, Y is represented by the format as shown in FIG. 2A according to the proposed IEEE Standard. In FIG. 2A, S is the sign bit, the field E is for 8-bit exponent whose value is biased by 127 ($=2^7-1$), and the field F is for the 23-bit fraction, which, together with an implicit leading 1, yields the mantissa having a value 1.F. A normalized nonzero number as represented by the format of FIG. 2A has a value:

$$(-1)^{S*} \, 2^{E\text{-}127*} \, (1.F)$$

A first or X classification circuit 3 receives 31 bits in the fields E and F of the operand X from the X register 1 and determines the class of the operand X. The classification of the operands is made by attribute of the operands into five categories or classes, i.e., zero (ZERO), infinity (INF), not-a-number (NAN), normalized number (NML) and denormalized number (DNL). The X classification circuit 3 has six output lines, five of which are used to transmit signals $\overline{\text{ZERO}}$, $\overline{\text{INF}}$, $\overline{\text{NAN}}$, $\overline{\text{NML}}$ and $\overline{\text{DNL}}$, each of which is "0" when the operand X from the X register 1 is of the particular class. The remaining one output line is used to transmit a signal E0, which is "1" when the LSB in the field E is "1" or the operand X is DNL.

Figure 3:
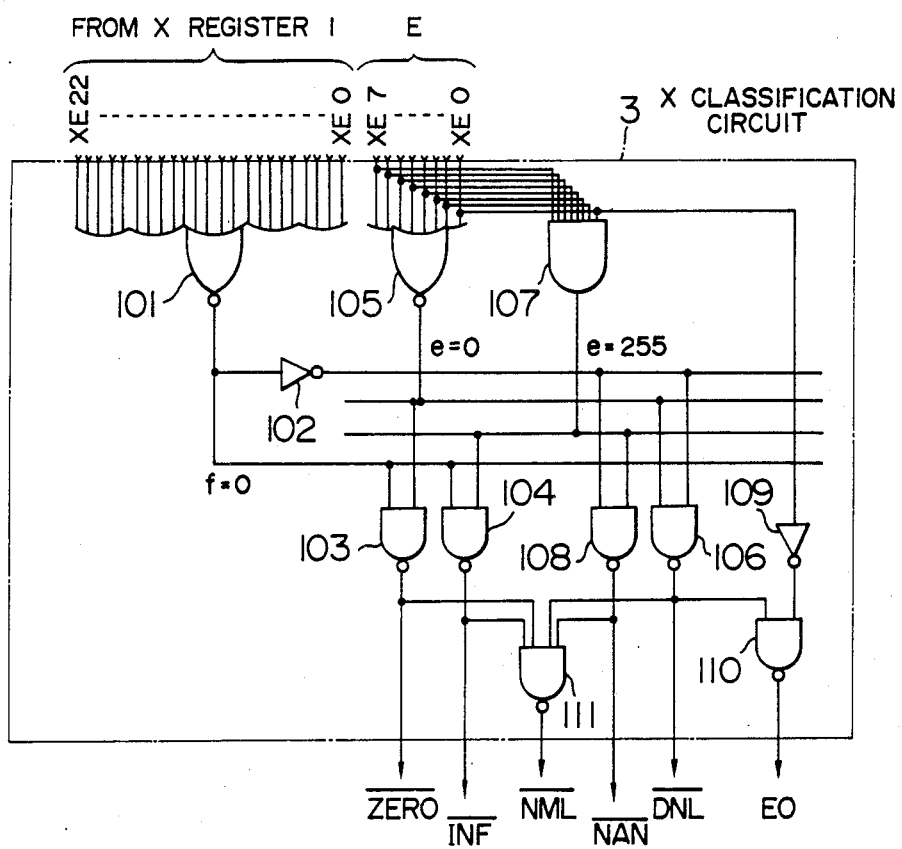
FIG. 3 is a block diagram showing an example of a classification circuit.

FIG. 3 shows in detail an example of the X classification circuit 3. As illustrated, it comprises a NOR gate 101 receiving 23 bits of the field F of the operand X. Its output is "1" when all the bits in the field F are "0". A second NOR gate 105 receives 8 bits of the field E of the operand X. Its output is "1" when all the bits in the field E are "0", i.e., E=0. An AND gate 107 also receives the 8 bits of the field E. Its output is "1" when the bits in the field E are all "1", i.e., E=255. A NOT circuit 102 inverts the output of the NOR gate 101. A NAND gate 103 receives the outputs of NOR gates 101 and 105, and its output $\overline{\text{ZERO}}$ is "0" when the operand X is zero. A NAND gate 104 receives the outputs of the NOR gate 101 and the AND gate 107 and its output $\overline{\text{INF}}$ is "0" when the operand X is infinity. A NAND gate 108 receives the outputs of the NOT circuit 102 and the AND gate 107 and its output $\overline{\text{NAN}}$ is "0" when the operand X is not-a-number. A NAND gate 106 receives the outputs of the NOT circuit 102 and the NOR gate 105 and its output $\overline{\text{DNL}}$ is "0" when the operand X is a denormalized number. A NAND gate 111 receives the outputs of the NAND gates 103, 104, 106 and 108 and its output $\overline{\text{NML}}$ is "0" when the operand X is a normalized number. A NOT circuit 109 inverts the LSB XE0 of field E of the operand X. A NAND gate 110 receives the outputs of the NOT circuit 109 and the NAND gate 106 and its output E0 is "1" when the LSB of the field E of the operand X is "1" or the operand X is a denormalized number. The E0 is used as a substitute for the LSB of the exponent.

A second or Y classification circuit 4 receives 31 bits in the fields E and F of the operand Y from the Y register 2 and determine the class of the operand Y. The structure and function of the Y classification circuit 4 are similar to those of the X classification circuit 3.

A class bus 5 comprises 10 signal lines carrying the signals $\overline{XZERO}$, $\overline{XINF}$, $\overline{XNML}$, $\overline{XNAN}$, $\overline{XDNL}$ which are the same as $\overline{ZERO}$, $\overline{INF}$, $\overline{NML}$, $\overline{NAN}$, $\overline{DNL}$ from the X classification circuit 3 and the signals $\overline{YZERO}$, $\overline{YINF}$, $\overline{YNML}$, $\overline{YNAN}$, $\overline{YDNL}$ which are the same as $\overline{ZERO}$, $\overline{INF}$, $\overline{NML}$, $\overline{NAN}$, $\overline{DNL}$ from the Y classification circuit 4.

An X bus 6 comprises 33 signal lines, 31 of which carry the sign bit, all the bits in the field F and the bits in the field E, except the LSB, of the output of the X register 1. The remaining two signal lines carry the outputs $\overline{DNL}$ and E0 of the X classification circuit 3. The output E0 is used to constitute the exponent's LSB. The output $\overline{DNL}$ is used to constitute the implied "1" bit of the mantissa M. Thus, the operand X is represented on the bus 6 by the format shown in FIG. 2B.

A Y bus 7 has a similar composition, except that it receives signals from the Y register 2 and the Y classification circuit 4 instead of the X register 1 and the X classification circuit 3.

A command bus 8 comprises three signal lines carrying signals A, S and M which are used to command addition, subtraction and multiplication, respectively, by being set at "1".

A multiplication section 20 comprises a normal or ordinary floating-point multiplication unit 20A, which comprises a sign processor 21, an exponent processor 22 and a mantissa processor 23.

The sign processor 21 comprises an Exclusive-OR gate receiving the sign bits from the X bus 6 and the Y bus 7.

The exponent processor 22 receives the 8-bit exponent from each of the X bus 6 and the Y bus 7, and comprises a circuit for adding the two exponents and making adjustment for normalization. It produces an 8-bit output signifying the exponent of the result Z of the multiplication (product). When the exponent field E becomes negative through the process of adjustment for normalization, an output signal SIGN becomes "1".

The mantissa processor 23 comprises a circuit for performing a fixed point multiplication on the two mantissas and a normalization circuit for normalizing the result of the fixed point multiplication. The processor 23 receives the 24-bit mantissa from each of the X bus 6 and the Y bus 7, and produces a 23 bit fraction for the result Z. Its additional output LONGSHIFT becomes "1" when the normalization requires rightward shift of more than 24 bits, and its further output POV becomes "1" when the exponent overflows.

A fraction selector 26 receives the 23 bit fraction signal from the mantissa processor 23 and the 23 bit output of a ROM 26A. The 23 bits from the ROM 26A are all "0".

The fraction selector control circuit 27 receives the signals LONGSHIFT and POV from the mantissa processor 23 and the signals $\overline{XZERO}$, $\overline{YZERO}$, $\overline{XDNL}$, and $\overline{YDNL}$ from the class bus 5, and determines MZERO by the following logical equation.

$$MZERO = \overline{XZERO} + \overline{YZERO} + \overline{XDNL} \cdot \overline{YDNL} + POV + LONGSHIFT$$

The fraction selector 26 is controlled by the signals MZERO and $\overline{MZERO}$ from the control circuit 27 and selects the output of the ROM 26A when the signal MZERO is "1", and selects the output of the processor 23 when $\overline{MZERO}$ is "1".

An exponent selector 24 receives the 8 bit exponent signal from the exponent processor 22 and the 8 bit outputs of ROM's 24A and 24B. The 8 bits from the ROM 24A are all "1", while the 8 bits from the ROM 24B are all "0".

An exponent selector control circuit 25 receives the signal POV from the mantissa processor 23, the signal SIGN from the exponent processor 22 and the signals $\overline{XZERO}$, $\overline{YZERO}$, $\overline{XDNL}$ and $\overline{YDNL}$ from the class bus 5, and determines the signals EONE, EZERO and ENORMAL by the following logical equations:

$$EONE = POV$$
$$EZERO = \overline{XZERO} + \overline{YZERO} + \overline{XDNL} \cdot \overline{YDNL} + SIGN$$
$$\overline{ENORMAL} = EONE + EZERO$$

The exponent selector 24 is controlled by the exponent selector control circuit 25 and selects the output of the ROM 24A when the signal EONE is "1", selects the output of the ROM 24B when the signal EZERO is "1", and selects the output of the exponent when the signal ENORMAL is "1".

When at least one of the operands X and Y is ZERO, the signals MZERO and EZERO are both "1". When the operands X and Y are both DNL, the signals MZERO, EZERO are both "1". The signal MZERO is also "1" when the signal POV or the signal LONGSHIFT is "1". The signal EONE is "1" when the signal POV is 1, i.e., an exponent overflow occurs. The signal EZERO is "1" when the exponent underflow occurs. The signal ENORMAL becomes "1" when neither EONE nor EZERO is "1".

The outputs of the exponent selector 24 and the fraction selector 26, together with the output of the sign circuit 21 form a 32 bit output of the multiplication section 20.

An addition/subtraction section 40 receives 33 bits from the X bus 6 and 33 bits from the Y bus 7. It also receives the signal S from the command bus 8 and the signals from the class bus 5. It comprises a normal or ordinary floating-point addition/subtraction unit 40A comprising an array of adders. The addition/subtraction unit 40A performs either addition or subtraction depending on the significance of the signal S. More particularly, it performs addition when the signal S is "0", and it performs subtraction when the signal S is "1".

The addition/subtraction section 40 has a further function of adopting a predetermined set of bits as at least part of the result of the operation, in place of the corresponding bits of the result of the operation performed by the unit 40A, when either operand is in a special class.

A selector 32 receives the outputs of the multiplication section 20 and the addition/subtraction section 40, and selects the output of the multiplication section 20 when the signal M is "1" and selects the output of the addition/subtraction section 40 when the signal M is "0".

An exception handling section 10 comprises a mantissa comparator 11, a control PLA (programmable logic array) 12, a selector 13 and a sign circuit 14.

The mantissa comparator 11 reads the 24-bit mantissa from each of the X bus 6 and the Y bus 7. Its output $(X>Y)_0$ becomes "1" when the mantissa of the operand X is found to be greater than the mantissa of the operand Y.

Figure 6:
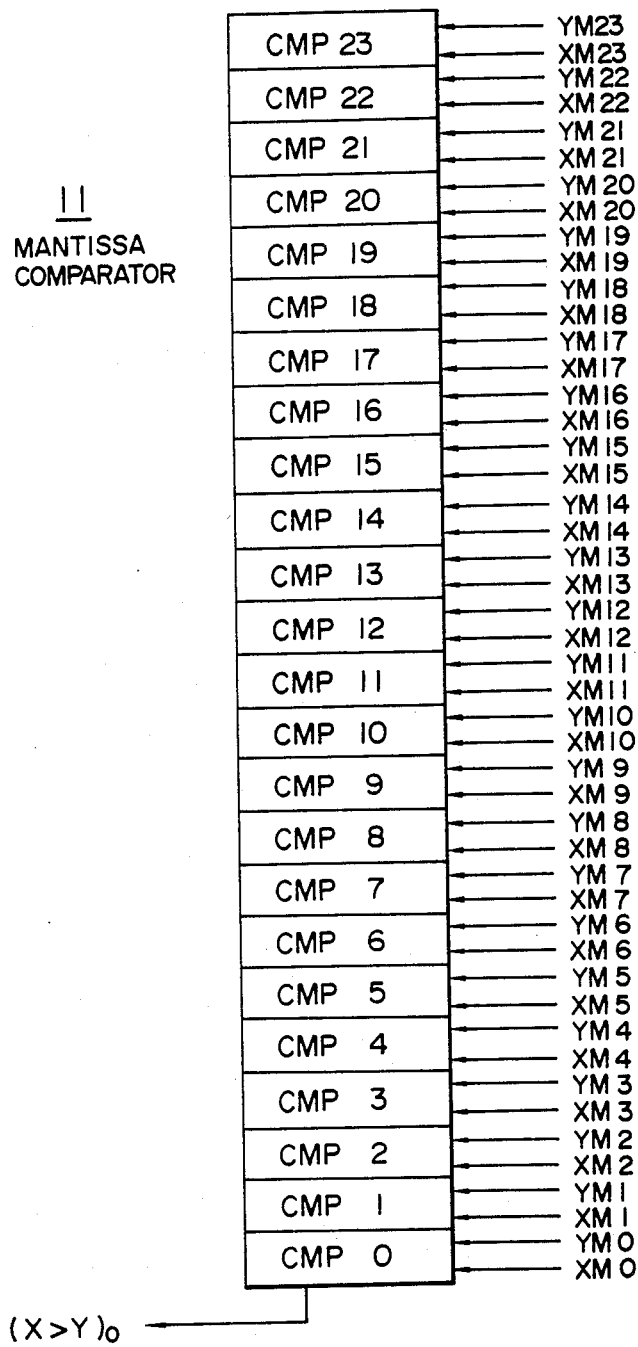
FIGS. 6 and 7 show in detail an example of a mantissa comparator.

FIG. 6 shows in detail the mantissa comparator 11. As shown, it comprises 24 comparison units CMP0–CMP23, receiving respective bits XM0–XM23 and YM0–YM23 of the mantissas of the operand X and the operand Y.

Figure 7:
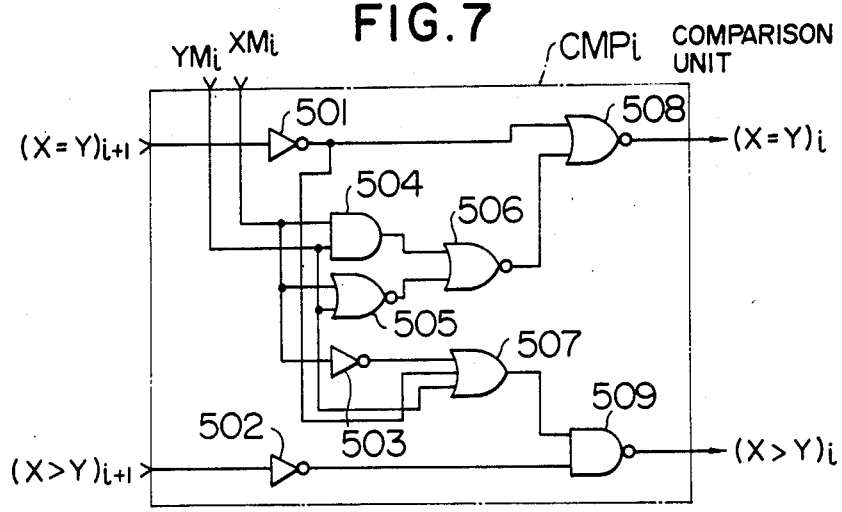

FIG. 7 shows in detail one of the comparison units CMPi (i=0—23). It receives one each bit XMi, YMi of the operands X, Y. It also receives signals $(X=Y)_{i+1}$ and $(X>Y)_{i+1}$ from a comparison unit CMP$_{i+1}$ for the next higher bit. When the signal $(X=Y)_{i+1}$ is "1", it signifies that the higher order bits (down to the next higher bit (i+1)) at the mantissas of the operands are identical to each other. When the signal $(X>Y)_{i+1}$ is "1", it signifies that the comparison down to the next higher bit (i+1) has revealed that the mantissa of X is greater than the mantissa of Y. How these signals $(X=Y)_{i+1}$ and $(X>Y)_{i+1}$ are derived will be understood from the following description on how the signals $(X=Y)_i$ and $(X>Y)_i$ are derived. The comparison unit CMP23 of the MSB always receives "1" for the $(X=Y)_{i+1}$ signal, and "0" for the $(X>Y)_{i+1}$ signal.

As illustrated, the comparison unit CMP$_i$ comprises NOT circuits 501, 502, 503, respectively receiving the signals $(X=Y)_{i+1}, (X>Y)_{i+1}$, XM$_i$. An AND gate 504 and a NOR gate 505 receives the signals XM$_i$ and YM$_i$. A NOR gate 506 receives the outputs of the AND gate 504 and the NOR gate 505. An OR gate 507 receives the outputs of the NOT circuits 501, 503 and the signal YM$_i$. A NOR gate 508 receives the outputs of the NOT circuit 501 and the NOR gate 506. A NAND gate 509 receives the outputs of the OR gate 507 and the NOT circuit 502. The output of the NOR gate 508 constitutes a signal $(X=Y)_i$ and the output of the NAND gate constitutes a signal $(X>Y)_i$. The function of the logical network described can be represented by the following logical expressions.

$$(X=Y)_i = (X=Y)_{i+1} \cdot (XM_i \oplus YM_i)$$

$$(X>Y)_i = (X>Y)_{i+1} + XM_i \cdot \overline{YM_i}) X=Y)_{i+1}$$

These signals $(X=Y)_i$ and $(X>Y)_i$ are supplied to a comparison unit CMP$_{i-1}$ for the next lower bit. The signal $(X>Y)_0$ from the comparison circuit CMP$_0$ for the LSB indicates the ultimate result of the comparison between the mantissas of the operands X and Y and is used as the output of the mantissa comparator 11.

The control PLA 12 receives 6 bit signals $\overline{XZERO}$, $\overline{XINF}$, $\overline{XNAN}$, $\overline{YZERO}$, $\overline{YINF}$, $\overline{YNAN}$ from the class bus 5. The control PLA 12 also receives the sign bit XS from the X bus 6, and the sign bit YS from the Y bus 7, and the signals A and S from the command bus 8 respectively commanding addition and subtraction.

Figure 5:
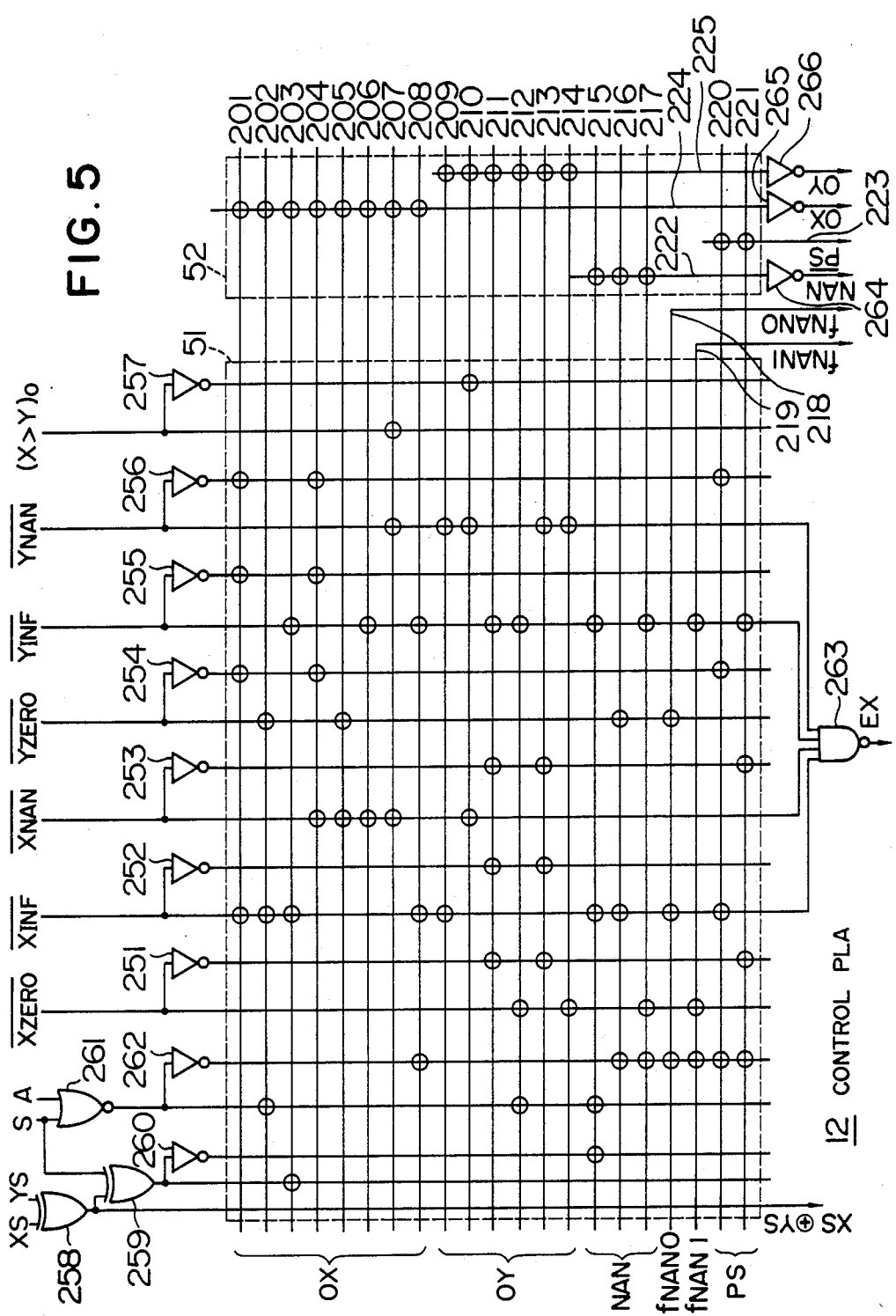
FIG. 5 shows in detail an example of a control PLA.

FIG. 5 shows in detail the control PLA 12. As illustrated, it comprises NOT circuits 251–257 respectively receiving the signals $\overline{XZERO}$, $\overline{XINF}$, $\overline{XNAN}$, $\overline{YZERO}$, $\overline{YINF}$, $\overline{YNAN}$ and $(X>Y)_O$. It also comprises an Exclusive-OR gate 258 receiving the signals XS and YS, an Exclusive-OR gate 259 receiving the output of the Exclusive-OR gate 258 and the signal S, a NOT circuit 260 receiving the output of the Exclusive-OR gate 259, a NOR gate receiving the signals A and S, a NOT circuit 262 receiving the output of the NOR gate and a NAND gate 263 receiving the signals $\overline{XINF}$, $\overline{XNAN}$, $\overline{YINF}$, and $\overline{YNAN}$. The output EX is therefore given by:

$$EX = XINF + XNAN + YINF + YNAN$$

The PLA 12 further comprises an AND circuit block 51 and an OR circuit block 52. The inputs to the AND circuit block 51 are those coupled to the upper ends of the vertical conductors or columns. The outputs of the AND circuit block 51 are derived from the horizontal conductors or rows 201–221. The output of each row is given as a product of inversions of those inputs of the columns whose intersections with the row in question are circled.

The inputs to the OR circuit 52 are placed on the horizontal conductors or rows connected to the outputs of the AND circuit 51. The outputs of the OR circuit 52 are derived from the vertical conductors or columns 222–225. The output of each column is given as the result of NOR operation of the inputs of the rows whose intersection with the column in question are circled.

It will therefore be appreciated that the outputs on the respective conductors 201–225 or their inversions are given by the following expressions:

$201 = XINF \cdot YZERO \cdot YINF \cdot YNAN$ $202 = (A+S) \cdot XINF \cdot YZERO$ $203 = (S \oplus XS \oplus YS) \cdot XINF \cdot YINF$ $204 = XNAN \cdot YZERO \cdot YINF \cdot YNAN$ $205 = XNAN \cdot YZERO$ $206 = XNAN \cdot YINF$ $207 = XNAN \cdot YNAN \cdot (X>Y)_0$ $208 = (A+S) \cdot XINF \cdot YINF$ $209 = XINF \cdot YNAN$ $210 = XNAN \cdot YNAN \cdot (X>Y)_0$ $211 = XZERO \cdot XINF \cdot XNAN \cdot YINF$ $212 = (A+S) \cdot XZERO \cdot YINF$ $213 = XZERO \cdot XINF \cdot XNAN \cdot YNAN$ $214 = XZERO \cdot YNAN$ $215 = (S \oplus XS \oplus YS) \cdot (A+S) \cdot XINF \cdot YINF$ $216 = (A+S) \cdot XINF \cdot YZERO$ $217 = (A+S) \cdot XZERO \cdot YINF$ $218 = (A+S) \cdot XINF \cdot YZERO$ $219 = (A+S) \cdot XZERO \cdot YINF$ $220 = (A+S) \cdot XINF \cdot YZERO \cdot YNAN$ $221 = (A+S) \cdot XZERO \cdot XNAN \cdot YINF$ $222 = (S \oplus XS \oplus YS) \cdot (A+S) \cdot XINF \cdot YINF + (A+S) \cdot XINF \cdot YZERO + (A+S) \cdot XZERO \cdot YINF$ $223 = (A+S) \cdot XINF \cdot YZERO \cdot YNAN + (A+S) \cdot XZERO \cdot XNAN \cdot YINF$ $\overline{224} = XINF \cdot \overline{YZERO} \cdot \overline{YINF} \cdot \overline{YNAN}$ $\qquad + (A+S) \cdot XINF \cdot YZERO$ $\qquad + \overline{(S \oplus XS \oplus YS)} \cdot XINF \cdot YINF$ $\qquad + XNAN \cdot \overline{YZERO} \cdot \overline{YINF} \cdot \overline{YNAN}$ $\qquad + XNAN \cdot YZERO + XNAN \cdot YINF$ $\qquad + XNAN \cdot YNAN \cdot \overline{(X>Y)_0} +$ $\qquad\qquad XINF \cdot YINF \cdot \overline{(A+S)}$ $\overline{225} = XINF \cdot YNAN + XNAN \cdot YNAN \cdot (X>Y)_0$ $\qquad + \overline{XZERO} \cdot \overline{XINF} \cdot \overline{XNAN} \cdot YINF$ $\qquad + (A+S) \cdot XZERO \cdot YINF$ $\qquad + \overline{XZERO} \cdot \overline{XINF} \cdot \overline{XNAN} \cdot YNAN +$
$\qquad\qquad XZERO \cdot YNAN$ The output on the conductors 222, 224, 225 are inverted by inverters 264, 265, 266 to become signals NAN, OX, OY, respectively, while the outputs on the conductors 218, 219, 223 constitute signals fNAN0, fNAN1, $\overline{PS}$, respectively, so that these signals (or their inversions) are represented by the following expressions:

$fNAN1 = 219$ $\qquad = \overline{(A+S)} \cdot XZERO \cdot YINF$ $fNAN0 = 218$ $\qquad = \overline{(A+S)} \cdot XINF \cdot YZERO$ $NAN = \overline{222}$ $\qquad = (S \oplus XS \oplus YS) \cdot (A+S) \cdot XINF \cdot YINF$ $\qquad + \overline{(A+S)} \cdot XINF \cdot YZERO$ $\qquad + \overline{(A+S)} \cdot XZERO \cdot YINF$ $PS = \overline{223}$ $\qquad = \overline{(A+S)} \cdot XINF \cdot \overline{YZERO} \cdot \overline{YNAN}$ $\qquad + \overline{(A+S)} \cdot \overline{XZERO} \cdot \overline{XNAN} \cdot YINF$ $OX = \overline{224}$ $\qquad = XINF \cdot \overline{YZERO} \cdot \overline{YINF} \cdot \overline{YNAN}$ $\qquad + (A+S) \cdot XINF \cdot YZERO$ $\qquad + \overline{(S \oplus XS \oplus YS)} \cdot XINF \cdot YINF$ $\qquad + XNAN \cdot \overline{YZERO} \cdot \overline{YINF} \cdot \overline{YNAN}$ $\qquad + XNAN \cdot YZERO + XNAN \cdot YINF$ $\qquad + XNAN \cdot YNAN \cdot \overline{(X>Y)_0}$ $\qquad + XINF \cdot YINF \cdot \overline{(A+S)}$ $OY = \overline{225}$ $\qquad = XINF \cdot YNAN + XNAN \cdot YNAN \cdot (X>Y)_0$ $\qquad + \overline{XZERO} \cdot \overline{XINF} \cdot \overline{XNAN} \cdot YINF$ $\qquad + (A+S) \cdot XZERO \cdot YINF$ $\qquad + \overline{XZERO} \cdot \overline{XINF} \cdot \overline{XNAN} \cdot YNAN +$
$\qquad\qquad XZERO \cdot YNAN$ Moreover, the output of the Exclusive-OR gate 258 is given by:

$XS \oplus YS$

This signal is used as another output of the control PLA 12.

Figure 2B:
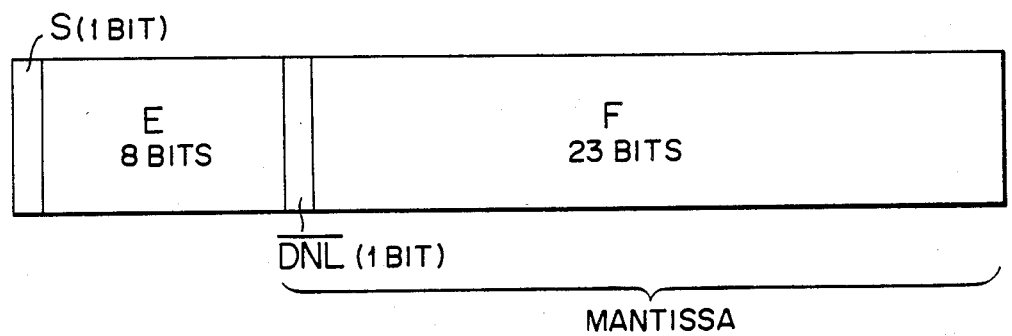
Figure 2C:
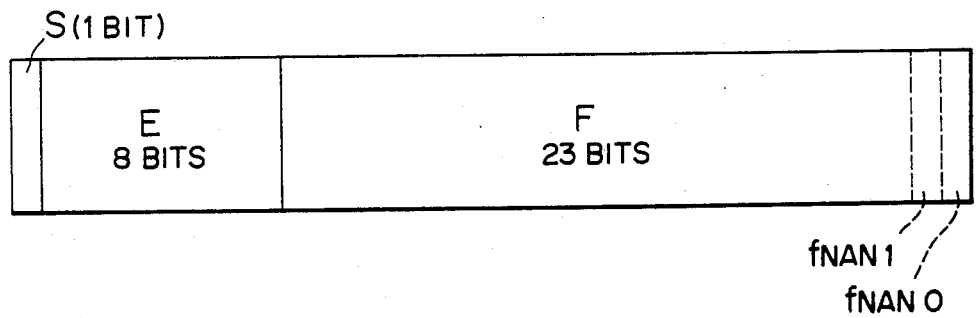

The selector 13 receives a 31 bit signal, which does not include the sign bit and the $\overline{DNL}$ bit in FIG. 2B, from each of the X bus 6 and the Y bus 7. It also receives a combination of 29 bits, which are all "1", from a ROM 13A and two bits fNAN0, fNAN1 from the control PLA 12, the two bits fNAN0, fNAN1 forming the LSB and the second least significant bit. Thus, the bit array of the "combination" is as shown in FIG. 2C.

The selector 13 selects one of the three inputs in accordance with signals OX, OY, NAN supplied from the control PLA and acting as selection control signals. More specifically, when the signal OX is "1", the input from the X bus 6 is selected. When the signal OY is "1", the input from the Y bus 7 is selected. When the signal NAN is "1", the "combination" is selected.

Figure 8:
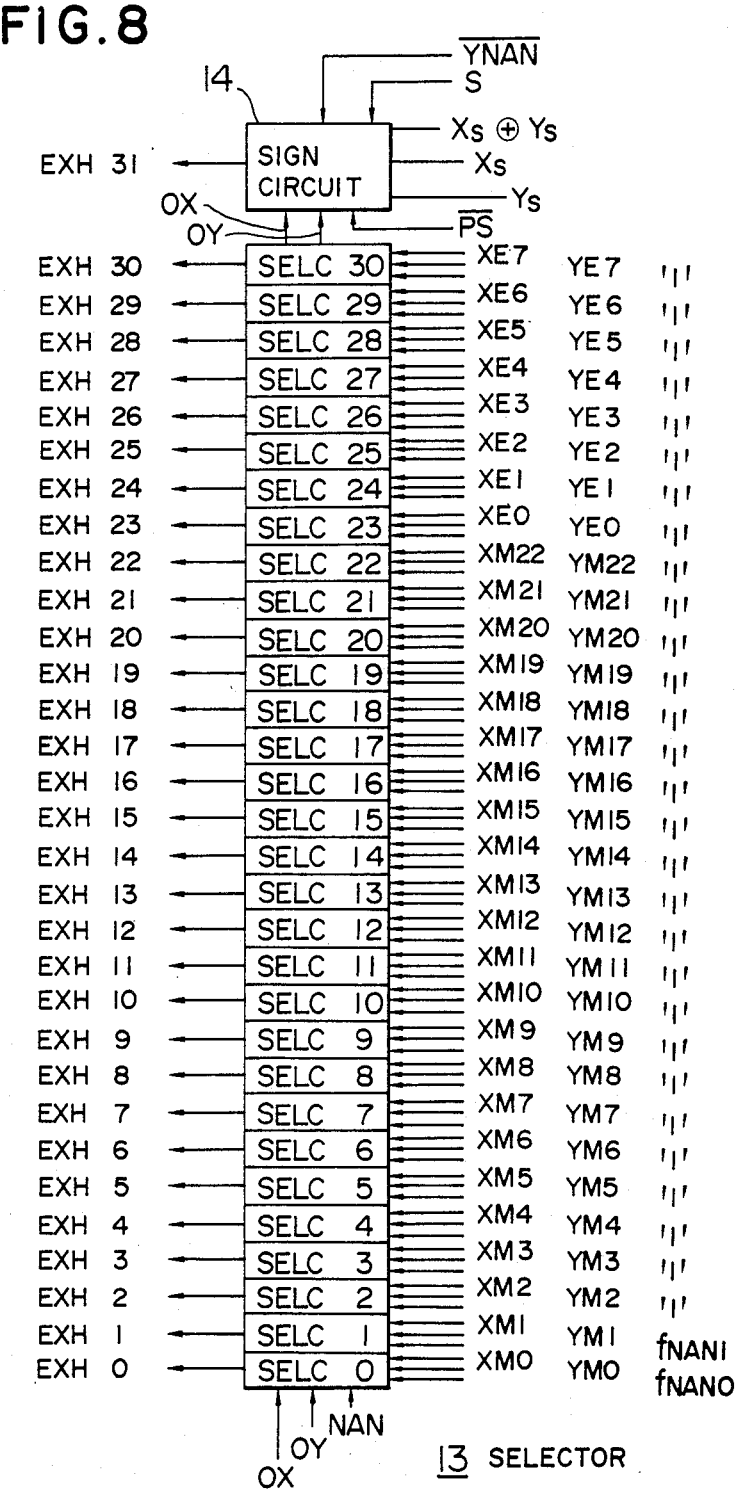

FIG. 8 shows in detail the selector 13 and the sign circuit 14. As illustrated, the selector 13 comprises 31 selection units SELC0–SELC30 receiving, at first input terminals XM0–XM22 and XE0–XE7 from the X bus 6, at second input terminals YM0–YM22 and YE0–YE7 from the Y bus 7, and, at third input terminals, fNAN-0-fNAN1 from the control PLA 12 and "1". . . "1" from the ROM 13A. The selection by each selection unit is in accordance with the signals OX, OY, NAN from the control PLA 12.

The sign circuit 14 receives the sign bit XS from the X bus 6, the sign bit YS from the Y bus 7, the signals $XS \gamma YS$, $\overline{PS}$, OX, OY from the control PLA 12, the signal $\overline{YNAN}$ from the class bus 5 and the signal S from the command bus 8, and determines the significance of the output EXH31, which forms the sign bit of Z, in accordance with the significance of the inputted signals.

The outputs EXH0–EXH31 of the selctor 13 and the sign circuit 14 form a 32 bit array of the proposed IEEE standard (FIG. 2A).

Figure 9:
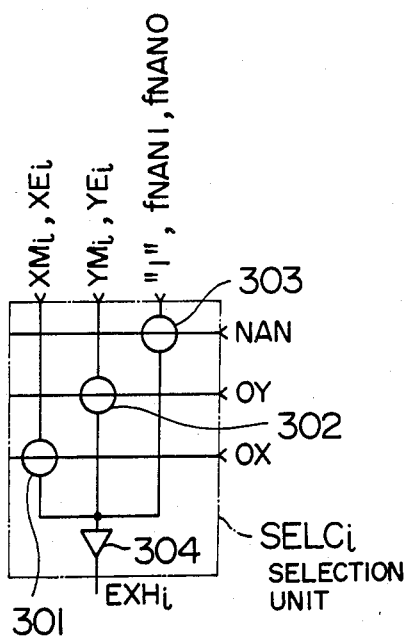
FIGS. 8–10 show in detail an example of a selector and a sign circuit.

FIG. 9 shows in detail one of the selection units SELC0–SELC30. As illustrated this selection unit $SELC_i$ comprises a transfer gate 301 receiving a data bit from the X bus, a transfer gate 302 receiving a data bit from the Y bus, and a transfer gate 303 receiving a data bit 303 from the ROM 13 or one of fNAN1 and fNAN0. The transfer gates 301, 302 and 303 are made open when the corresponding one of the signals OX, OY and NAN is "1". An amplifier 304 amplifies the selected output of the transfer gates. The output of the amplifier 304 constitutes the output EXH$_i$ of the selection unit SELC$_i$.

Figure 10:
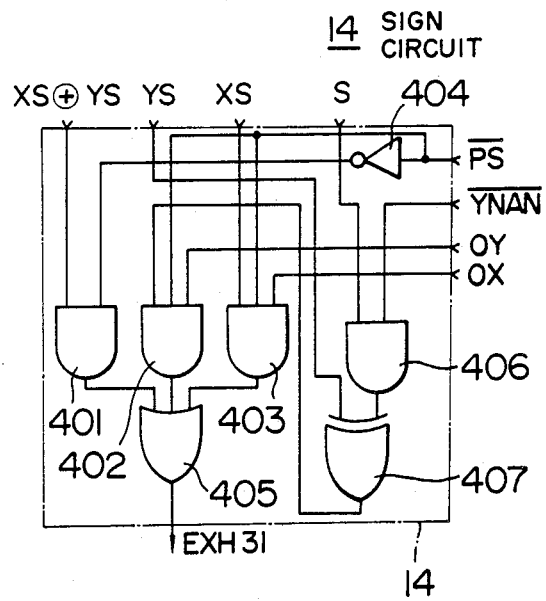

FIG. 10 shows in detail the sign circuit 14. A NOT circuit 404 receives the signal $\overline{PS}$. An AND gate 401 receives the signal XS⊕YS and the output of the NOT circuit 404. An AND gate 406 receives the signal S and the signal $\overline{YNAN}$. An Exclusive-OR gate 407 receives the signal YS and the output of the AND gate 406. An AND gate 402 receives the output of the Exclusive-OR gate 407, the signal $\overline{PS}$, and the signal OY. An AND gate 403 receives the signal XS, the signal $\overline{PS}$ and the signal OX. An OR gate 405 receives the outputs of the AND gates 401, 402 and 403. The output of the OR gate constitutes the output EXH31 of the sign circuit 14. The output EXH31 is therefore given by:

$$EXH31 = (XS \oplus YS) \cdot PS + (YS \oplus (S \cdot \overline{YNAN})) \cdot \overline{PS} \cdot OY + XS \cdot \overline{PS} \cdot OX$$

FIG. 4 shows the relationship between some of combinations of the inputs, i.e., the types of the given operands and the kinds of arithmetic operation commanded and the output, i.e., how the value of the output Z and its sign bit should be determined. The value in the columns ZERO, INF, NAN for the operand X is "1" or "0" depending on whether the operand X is ZERO, INF or NAN. The value in the columns ZERO, INF, NAN for the operand Y is "1" or "0" depending on whether the operand Y is ZERO, INF or NAN. The value in the column A+S (=$\overline{M}$) is "1" when either addition or subtraction is commanded and is "0" when multiplication is commanded. "X" in the column Z(efZ) signifies that the Z=X, so that all the bits of X should be used, without change, as the bits of Z. "(X)" in the same column signifies that the exponent and the fraction of Z are equal to those of X, so that all the bits except the sign bit should be used, without change, as the bits of Z. "Y" and "(Y)" in the same column have similar significances. "NAN" in the column Z(efZ) indicates that exponent and fraction of Z should have a value of NAN, i.e., the exponent should be all "1" as prescribed by the proposed IEEE standard and the fraction should be one of the predetermined values. The value of the fraction for each case NAN(#1), NAN(#2), NAN(#3) is as indicated in the column fZ. The column ZS is provided to indicate the sign bit of Z where the column Z(efZ) does not specify the sign bit of Z or where Z is NAN.

The output of the selector 13 and the output of the sign circuit 14 form a 32 bit output of the exception handling section 10.

A selector 31 receives the output of the exception handling section 10 and the selector 32. It also receives the signal EX from the control PLA12. It selects the output of the exception handling section 10 when the signal EX is "1", and selects the output of the selector 32 when the signal EX is "0".

In operation, operands in the X register 1 and the Y register 2 are supplied to the X classification circuit 3 and the Y classification circuit 4, and classified into ZERO, INF, NAN, DNL and NML. The signals $\overline{ZERO}$, $\overline{INF}$, $\overline{NAN}$, $\overline{DNL}$ and $\overline{NML}$ indicative of the results of the classification are transferred via the class bus 5 and delivered to the control PLA12, the exponent selector control circuit 25 and the fraction selector control circuit 27. Thus, the signals indicative of the results of the classification are used in the multiplication section 20 to directly produce the value for Z (the result of arithmetic operation) without recourse to a normal floating-point multiplication operation when either or both of the operands is of one of special classes (ZERO, DNL). Similar processing is performed in the addition/subtraction section 40 to directly produce the value of Z without recourse to normal floating-point addition/subtraction operation when either or both of the operands is of one of special classes.

When the combination of the kind of arithmetic operation to be performed and the classes of the operands X and Y is one of those shown in the table of FIG. 4, 32-bit value of Z, which is the result of exception handling, is produced by the exception handling section 10 and is supplied to the selector 31, which selects, responsive to the signal EX from the control PLA 12, the result of the exception handling.

As has been described, the invention provides a floating-point arithmetic operation system having hardware units for classifying the operands and performing exception handling. The system is therefore capable of attaining a higher processing speed than conventional systems with a microprogram for the exception handling.

What is claimed is:

1. A floating-point arithmetic operation system for performing an arithmetic operation on two given operands X, Y and providing the result Z of the arithmetic operation, comprising:
   an X classification circuit receiving at least part of the bits representing the operand X to classify the operand X based only on said received operand X bits and producing at least one corresponding X class signal indicative of the result of the classification;
   a Y classification circuit receiving at least part of the bits representing the operand Y to classify the operand Y based only on said received operand Y bits and producing at least one corresponding Y class signal indicative of the result of the classification; and
   adopting means responsive to the X class signal, and Y class signal for adopting at least part of the bits of the corresponding operand X, at least part of the bits of the corresponding operand Y or a predetermined set of bits, as at least part of the result of Z of the operation when the X class signal and the Y class signal are in predetermined categories.

2. A system of claim 1, wherein said adopting means comprises:
   a control logic circuit responsive to the X class signal and the Y class signal for producing a set of control signals; and
   selecting means receiving, as the inputs, the corresponding operand X, the corresponding operand Y and at least one predetermined set of bits and selecting one of the inputs in accordance with the control signals.

3. A system of claim 2, wherein
   said control logic circuit also receives a command signal specifying the kind of arithmetic operation to be performed, and is also dependent on the command signal for producing said set of control signals.

4. A signal of claim 1, further comprising:

a floating-point arithmetic operation unit performing an arithmetic operation on the operands X and Y; and a control circuit responsive to the corresponding X class signal and the corresponding Y class signal for producing a set of control signals;

wherein said adopting means comprises selecting means having an output and having inputs receiving the result of the arithmetic operation performed by said floating-point arithmetic operation unit, at least part of the bits of the operand X, at least part of the bits of the operand Y, and a predetermined set of bits and selectively providing one of the inputs to the output in accordance with the control signals.

5. A system of claim 4, wherein said floating-point arithmetic operation unit comprises a floating-point multiplication unit comprising a mantissa processor performing multiplication on the mantissas of the operands X and Y and normalization where necessary and an exponent processor performing addition of the exponents of the operands X and Y, and adjustment attendant on the normalization.

6. A system of claim 1, further comprising:

a floating-point arithmetic operation unit performing an arithmetic operation on the operands X and Y when the corresponding X class signal and Y class signal do not fall into said predetermined categories; and a control circuit responsive to the X class signal and the Y class signal for producing a set of control signals wherein said adopting means comprises selecting means having an output and having inputs receiving the result of the arithmetic operation performed by said floating-point arithmetic operation unit, at least part of the bits of the operand X, at least part of the bits of the operand Y, and a predetermined set of bits and selectively providing one of the inputs to the output in accordance with the control signals.

7. A system of claim 6, wherein said floating-point arithmetic operation unit comprises a floating-point multiplication unit comprising a mantissa processor performing multiplication on the mantissas of the operands X and Y and normalization where necessary and an exponent processor performing addition of the exponents of the operands X and Y, and adjustment attendant on the normalization.

* * * * *